Sept. 28, 1943.    L. A. DE MORE    2,330,339
REFRIGERATED VEHICLE BODY
Filed Oct. 19, 1939    3 Sheets-Sheet 2
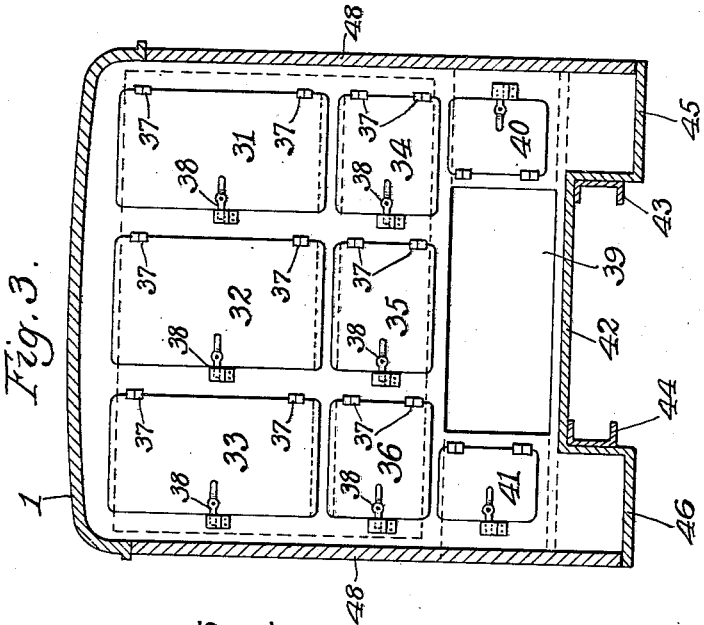
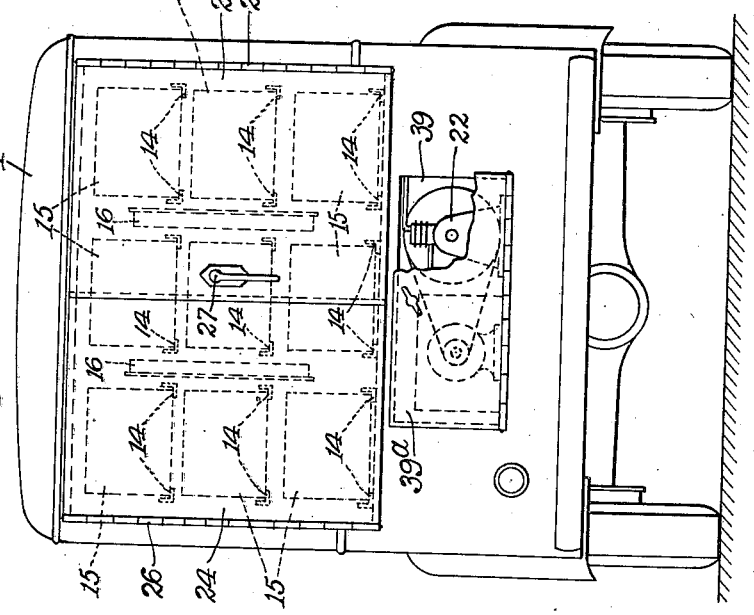
Inventor.
Leonel A. DeMore.
by Parker & Carter
Attorneys.

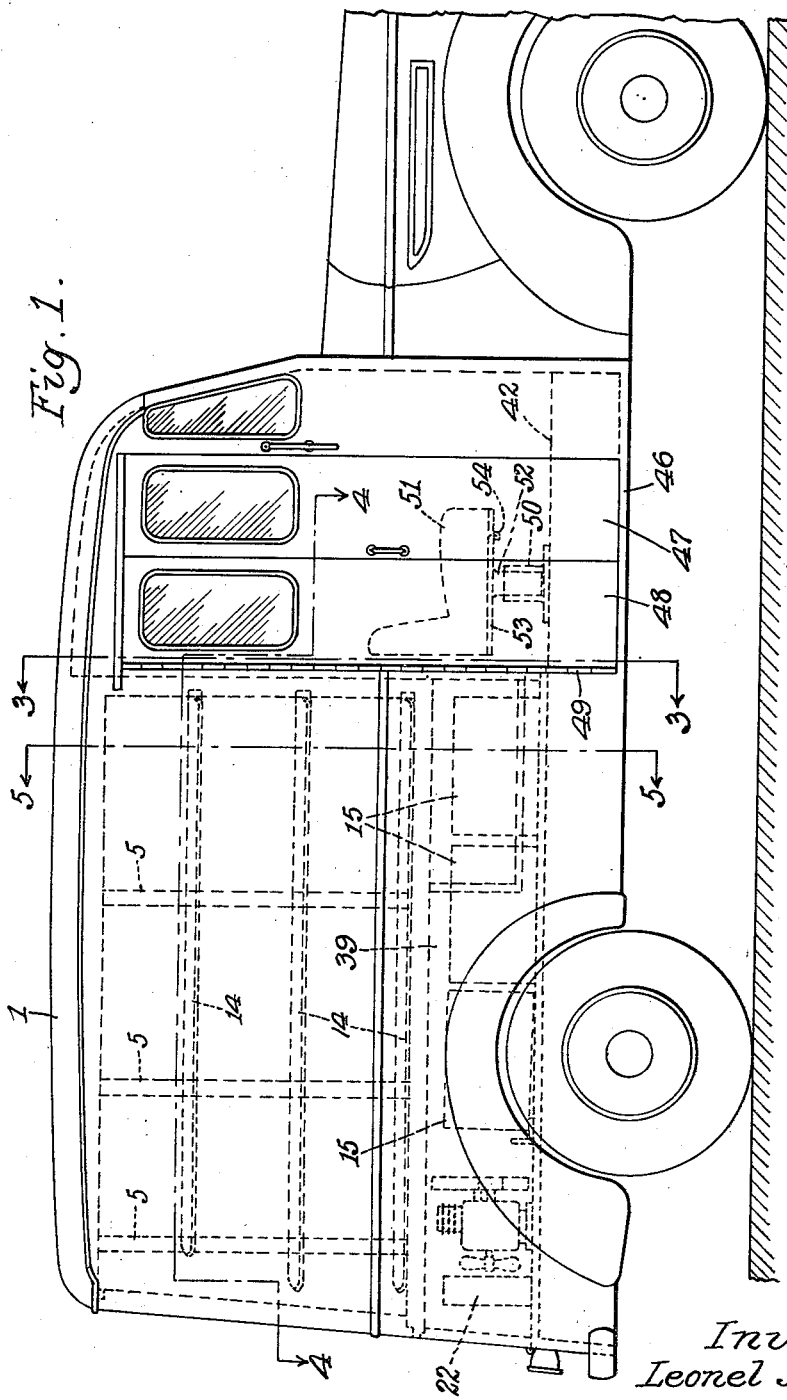

Sept. 28, 1943.  L. A. DE MORE  2,330,339
REFRIGERATED VEHICLE BODY
Filed Oct. 19, 1939  3 Sheets-Sheet 3
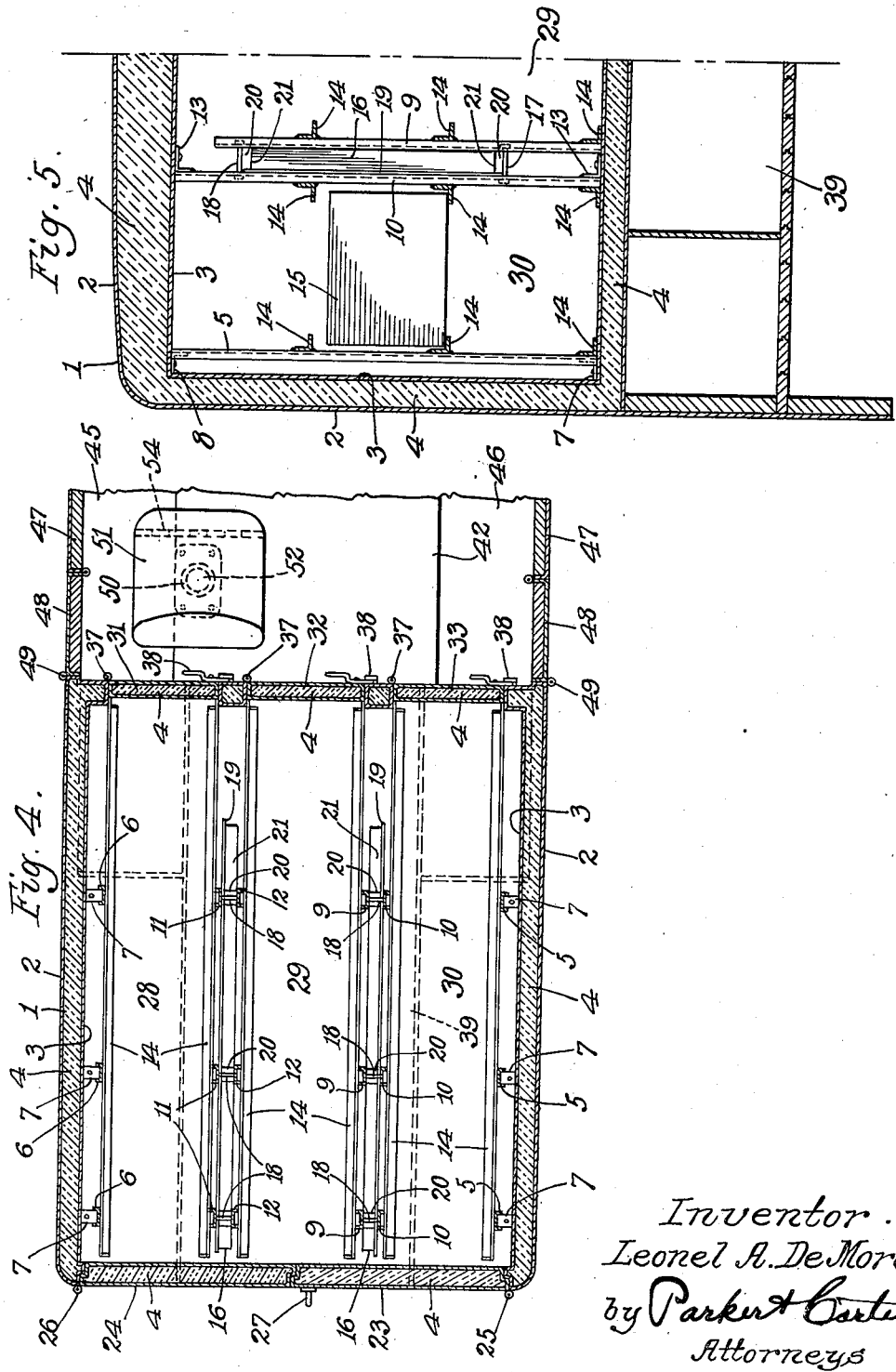
Inventor.
Leonel A. DeMore.
by Parker & Carter
Attorneys Patented Sept. 28, 1943

2,330,339

UNITED STATES PATENT OFFICE 2,330,339

REFRIGERATED VEHICLE BODY

Leonel A. De More, Oak Park, Ill., assignor to Batavia Body Company, Incorporated, Batavia, Ill., a corporation of Illinois Application October 19, 1939, Serial No. 300,217

6 Claims. (Cl. 62—17)

This invention relates to refrigerated vehicle bodies and has for its object to provide a new and improved body of this description.

The invention has as a further object to provide an enclosed refrigerated vehicle body particularly adapted for transporting and delivering beverages and food products and maintaining them in a cool condition.

The various cities and states are more and more applying stringent regulations from a health standpoint for delivery of milk. In some localities, for example, the milk must be delivered to the customer at a comparatively low temperature, as low as fifty degrees Fahrenheit. With the trucks now in use for this purpose, this cannot be done, and when these regulations are strictly enforced, as they will be, some means must be provided for delivering the milk at the specified low temperature. One of the objects of the present invention is to provide a vehicle body for delivering milk and dairy products which will permit them to be delivered at the specified low temperature. With the present device, it has been found that the milk can be delivered to the customers at a temperature of from thirty-seven to thirty-eight degrees Fahrenheit. With the delivery wagons and trucks now used, it is necessary to load the milk in the early morning. This is becoming more and more undesirable and greatly reduces the efficiency of the plant, as the wagons and trucks must start out early and they all want to get loaded at the same time, thus creating confusion and inefficiency. One of the objects of the present invention is to provide a vehicle body by means of which the milk can be loaded into the body in the afternoon, so that the driver can start out immediately in the morning at any time he desires. This greatly increases the efficiency of the plant, for the delivery men generally get through from two to three o'clock in the afternoon and they then have plenty of time to load the milk with the assurance that it will be kept at the proper low temperature as effectively as if left in the plant.

The invention has as a further object to provide an enclosed refrigerated vehicle body for transporting and delivering beverages and food products, provided with means for securing a free circulation of cold air around the receptacles in which the beverages and food products are carried.

The invention has as a further object to provide an enclosed vehicle body for transporting and delivering beverages and food products, provided with a plurality of doors at the front of the body within reach of the driver, to simplify the removal of the beverages and food products.

The invention has as a further object to provide an enclosed refrigerated vehicle body for transporting and delivering beverages and food products, arranged to provide a minimum refrigeration loss at the time of removal of the beverages or food products.

The invention has as a further object to provide an enclosed vehicle body for transporting beverages and food products, having a rear door to permit loading of the body from the rear, and a plurality of separated front doors to permit unloading from the front.

The invention has further objects which are more particularly pointed out in the accompanying description.

Referring now to the drawings, Fig. 1 is a side elevation of a vehicle provided with one form of body illustrating the invention;

Fig. 2 is a rear elevation of the device shown in Fig. 1, with parts broken away;

Fig. 3 is a sectional view taken on line 3—3 of Fig. 1;

Fig. 4 is a sectional view taken on line 4—4 of Fig. 1; and

Fig. 5 is a sectional view taken on line 5—5 of Fig. 1, showing one-half of the interior of the body.

Like numerals refer to like parts throughout the several figures.

Referring now to the drawings, I have illustrated a refrigerated vehicle body 1, which may be of any size or shape desired. This body is heat insulated in any desired manner. As herein shown, there is an outer wall 2 and an inner wall 3, with heat insulating material 4 located between the walls, these walls extending all around the vehicle.

Located within the interior of the body and near the vertical walls thereof, are a plurality of upright members 5 and 6, which are preferably of iron, and I have illustrated them as being channel-irons. These upright members are connected at the top and bottom to the inner wall 3 in any desired manner, as by means of the angle-irons 7 and 8. In between the upright members 5 and 6 are one or more sets of opposed upright members 9 and 10 and 11 and 12, which are also preferably channel-irons and which are fastened to the top and bottom walls in any desired manner, as by the angle-irons 13.

Fastened to the upright members are a series of supporting guides 14, which are preferably of angle-iron. The milk or other food product to be transported and delivered is placed in boxes or receptacles 15 which rest on the supports 14 and which may be easily slid therealong. It is of course evident that any number of upright members and supporting guides may be used, depending upon the size of the body and the material to be transported and delivered.

Some suitable means is provided for refrigerating the interior of the body. For purposes of illustration I have shown the cooling effect to be produced by the cold plates 16, which may be positioned any place in the body desired, at the top, or at the sides, or at intermediate points. In the construction shown I have illustrated these plates as being located between the sets of upright members 9 and 10 and 11 and 12. The cooling plates may be supported in any desired manner, and as herein shown these plates are supported by cross members 17 which extend across the space between the upright members 9 and 10 and 11 and 12, the plates resting on these cross members. There is also preferably a cross member 18 above the plates, so as to hold them in proper position. These cross members may be bolts if desired. These plates are preferably provided with flanges 19 and there is associated with each of the cross members 17 and 18, a part 20 which engages these flanges and which are opposed to the edges 21 of the cooling plates.

These cooling plates may be of any construction desired. I prefer to provide vacuum plates of the Doleco type, wherein there is a coil in between two metal sheets, the sheets being hermetically sealed and the air exhausted, so as to tightly press the metal sheets against the coil. These plates may be holdover plates, that is, they may also contain a eutectic solution. A refrigerant material is circulated through the coils in the plate in any desired manner. This may be accomplished by providing at the rear end of the body below the insulated floor, a suitable refrigerating apparatus 22, which has the usual compressor and other parts and which is connected to the coils in the plates to circulate refrigerant material through them. If desired, the refrigerant material may be circulated through the plates at night at the plant, so that it will not be necessary to have the refrigerating apparatus on the truck. This is particularly true when the plates are holdover plates.

The rear of the body is provided with one or more doors. In the construction shown I have illustrated two doors 23 and 24, hinged at 25 and 26, the doors meeting and being held closed by the locking device 27. These doors permit the material to be loaded into the body from the rear, as it is usual to back the vehicle up to the loading platform, and permit quick loading of the body.

At the front of the body there are provided a series of doors for unloading and delivering the material. It will be noted that there are a plurality of vertical spaces 28, 29, 30, side by side, in which the boxes or receptacles 15 are maintained and there will preferably be a plurality of doors at the front, for each vertical space. As herein shown, the vertical spaces have the doors 31, 32 and 33 across the top and the smaller doors 34, 35 and 36 across the bottom. These doors are provided with suitable hinges 37 and suitable latching devices 38.

Located below the insulated floor of the cooling compartment of the body is a compartment 39 for receiving the empty containers or boxes after the material has been delivered, or the boxes with the empty containers in them. This compartment 39 is preferably open at the front, and closed at the rear end of the door 39a. There are also two compartments, one at each side of the body and located below the insulated floor of the cooling compartment, for tools or other purposes, which have doors 40 and 41. At the front of the body is a platform 42, see Figs. 1, 3 and 4, which rests upon the chassis members 43 and 44. Connected with this platform are the steps 45 and 46. There are doors at the front to form an enclosure for the driver. Each of these doors consists of the two members 47 and 48 which are hinged together and which are hinged to a portion of the body by the hinges 49. There is a pedestal 50 on the platform 42, at the extreme left edge thereof, see Figs. 1 and 4, and a seat 51, having a spindle 52, is rotatably mounted on the pedestal 50 by means of this spindle 52, so that it may be moved out of the way to open the doors. This seat is preferably constructed so that the back may be tilted forward. For this purpose the spindle 52 has attached to it a plate 53. The seat 51 is pivoted at 54 to this plate, so that the seat may be tipped forward about this hinge to give more room for the opening of the front doors and the removal of material.

It will be noted that the upright members and supporting devices which support the boxes containing the milk or other material also act as a strong frame for the body of the vehicle, so that a strong durable device is provided.

It will be seen that there is here provided a refrigerated vehicle body wherein there is one or more corridors extending therealong, with means for supporting the containers for the material to be delivered in said corridors, one above the other in different horizontal planes, there being one or more doors at the rear for loading said containers into said corridors and a door at the front for removing said containers from said corridors as they are being delivered, the containers closing the door opening when the front door is open. This holds the cold air in the receptacle, thereby preventing it from escaping. The containers are substantially the same width as the corridors, so as to effectively act as closures for the door opening when the front door is opened.

I have described in detail a particular construction embodying the invention, but it is of course evident that the parts may be varied in many particulars without departing from the spirit of the invention as embodied in the claims hereto appended and I therefore do not limit myself to the particular construction illustrated.

The use and operation of my invention are as follows:

The refrigerating apparatus may be run in any desired manner, as from the engine of the vehicle, or by a separate internal combustion engine, or by an electric motor. After the cold plates have been brought to the desired low temperature, either by the apparatus on the vehicle body, or by an outside refrigerating apparatus, the body is loaded with the material, as, for example, milk bottles in boxes. The body is backed up to the loading platform and the doors 23 and 24 opened. The boxes are then placed on the supporting guides 14 at the rear end of the body and pushed along until the innermost ones reach the front end. When the body is filled, all of the supporting guides have boxes thereon, and in the construction shown they are in tiers of three high. When the driver desires to deliver any of the milk, he preferably starts from one of the upper corners. He may, for example, open the door 31 and take out the first box containing the milk bottles. This box practically closes the opening until its inner end is pushed out, whereupon the door may be quickly closed, and this prevents any waste of the low temperature, or the falling out of cold air. The remaining boxes are pulled out by the driver by means of a hook on the end of a rod. The empty boxes which the driver picks up when he delivers the full boxes, at first are put into the receptacle 39 and this is at least large enough to hold as many empty boxes as the upper tier holds full boxes. After the full boxes on the upper tier have been delivered, the empty boxes may then be put in this space and this process continued as the other full boxes are delivered. The driver first delivers the boxes back of the doors 31, 32 and 33, and as before stated, this can be done without any large proportion of the cold air dropping out. The driver then starts in delivering the boxes behind the doors 34, 35 and 36. These boxes, while the boxes are being delivered, are immersed in the cold air, as none of the cold air surrounding them can come out when the upper doors are opened.

It will be seen that by this construction the cold air can circulate throughout the interior of the body so as to maintain the material in a properly cooled condition. It has been found that with a device of this construction the milk or other material can be delivered at a temperature as low, for example, as thirty-seven to thirty-eight degrees Fahrenheit.

I claim:

1. A refrigerated vehicle body for delivery purposes, comprising heat insulated walls enclosing a refrigerated receptacle, a plurality of separated upright members in said receptacle, arranged in separated planes extending along said body to form a corridor extending along the body, supporting guides on the opposed upright members, upon which the containers for the cooled material to be delivered are received, the space between the separated upright members being open to permit circulation of cold air, a door at one end of said corridor for loading the containers therein, and a plurality of separated doors at the other end of said corridor for removing the containers for the cooled material therefrom as they are to be delivered, said corridor being substantially the same width as the containers, so that when a front door is opened, the containers for the cooled material close the opening to prevent the cold air from falling out.

2. A refrigerated vehicle body for delivery purposes, comprising heat insulated walls enclosing a refrigerated receptacle, a plurality of separated upright members in said receptacle, arranged in separated planes extending along said body to form a corridor extending along the body, supporting guides on the opposed upright members, upon which the containers for the cooled material to be delivered are received, a door at one end of said corridor for loading the containers therein and a door at the other end of said corridor for removing the containers for the cooled material therefrom as they are to be delivered, the containers for the cooled material acting to close the door opening when the door is opened and preventing the cold air from dropping out.

3. A refrigerated vehicle body for delivery purposes, comprising heat insulated walls enclosing a refrigerated receptacle, the receptacle being provided with a corridor extending from the rear to the front thereof, a plurality of supporting means for supporting a plurality of tiers of containers for the cooled material to be delivered, a door at the rear of said corridor for loading the containers into said corridor, and a door at the front of said corridor for removing said containers for the cooled material as they are being delivered, said containers for the cooled material acting to close the door opening when the front door is open, and preventing the cold air from dropping out.

4. A refrigerated vehicle body for delivery purposes, comprising heat insulated walls enclosing a refrigerated receptacle, means for dividing said refrigerated receptacle into a plurality of corridors, supports in each of said corridors for supporting a plurality of containers for the cooled material to be delivered, in different horizontal planes, and a door at the end of each of said corridors through which said containers are removed when they are to be delivered, the front container in each corridor acting as a closure when the door is opened, to obstruct the discharge of the cold air from the vehicle body.

5. A refrigerated vehicle body for delivery purposes, comprising heat insulated walls enclosing a refrigerated receptacle, a plurality of upright members arranged in alignment from the front to the rear of the receptacle and arranged to form a plurality of opposed parallel sets, supporting guides between each of said sets, for supporting containers for the material to be delivered, and a plurality of doors through which said containers are removed, the doors being arranged one below the other, the front container on each of said sets of guides acting as a closure when the opposed door is opened, to obstruct the discharge of the cold air from the vehicle body, the lower doors acting to prevent the discharge of the cold air from the vehicle body when an upper door is opened.

6. A refrigerated vehicle body for delivering articles in a cooled condition comprising heat insulated walls enclosing a refrigerated receptacle, a plurality of horizontal separated guides in said receptacle upon which the containers for the cold material to be delivered are received, supports for said guides, a cold plate in said receptacle for maintaining a cold condition therein, a door in said receptacle through which the containers for the cold material are separately removed, said containers when the door is opened acting as a substitute for the door to close the opening and prevent the cold air from flowing out.

LEONEL A. DE MORE.